United States Patent [19]

Whall

[11] 3,925,800

[45] Dec. 9, 1975

[54] SPREAD ROLLER SYSTEM FOR SELF DEVELOPING TYPE PHOTOGRAPHIC APPARATUS

[75] Inventor: James M. Whall, Lexington, Mass.

[73] Assignee: Polaroid Corporation, Cambridge, Mass.

[22] Filed: May 2, 1974

[21] Appl. No.: 466,415

[52] U.S. Cl. ............................... 354/301; 354/86
[51] Int. Cl.² ........................................ G03D 9/00
[58] Field of Search .......... 354/83, 84, 85, 86, 301, 354/303, 304

[56] References Cited
UNITED STATES PATENTS

| | | | |
|---|---|---|---|
| 3,135,187 | 6/1964 | Mason et al. | 354/303 |
| 3,245,335 | 4/1966 | Sable | 354/303 |
| 3,776,118 | 12/1973 | Driscoll et al. | 354/86 |

Primary Examiner—Fred L. Braun
Attorney, Agent, or Firm—Alfred E. Corrigan

[57] ABSTRACT

Apparatus including a pair of rollers for spreading a processing fluid between a pair of photographic sheet elements at least one of which forms part of a film unit of the self-developing type. One of the rollers is rigid, having a substantially cylindrical configuration. The other roller is structurally configured to include a rigid support member having a curved exterior surface of convex shape over which lies a layer of resilient material having an internal shape similar to that of the exterior shape of the support member and an exterior sheet contacting surface whose shape is substantially cylindrical. Because of the structure of this second roller, the thickness of the resilient layer varies across the length of the roller thereby permitting a variation in the deformation capability of its sheet contacting surface. By specially selecting the variable deformation characteristics of this surface, both the initial distribution and subsequent flow patterns of the processing fluid may be controlled to meet the design requirements that the fluid thickness between the sheets be uniform and the film unit size minimized.

14 Claims, 7 Drawing Figures

SPREAD ROLLER SYSTEM FOR SELF DEVELOPING TYPE PHOTOGRAPHIC APPARATUS

REFERENCE TO RELATED APPLICATION

This application is related to my copending application Ser. No. 466,416, filed on even date herewith and entitled, "Spread Roller System For Self-Developing Type Photographic Apparatus".

BACKGROUND OF THE INVENTION

1. Field of the Invention

This invention relates to photography and, more particularly, to improved apparatus for distributing a processing fluid in a layer between a pair of superposed sheet elements.

2. Description of the Prior Art

In a process for producing a visible image from an exposed self-developing film unit, a fluid processing reagent is spread in a uniformly thin layer between a pair of superposed photographic sheet elements forming part of the film unit. The processing fluid is stored in a pressure rupturable container forming an integral part of the film unit, located adjacent a leading edge of the exposed area, and adapted to release its contents between the sheet elements when under the influence of an applied hydraulic pressure. Such film units, as for example those described in considerable detail in U.S. Pat. Nos. 2,543,181 and 3,415,644, normally contain all the photographic components necessary to carry out this process.

The physical arrangement of these components define an especially designed film unit structure that cooperates with a processing fluid apparatus to determine the distribution of the processing fluid thickness over the exposed area of the film unit. A processing fluid apparatus is likewise especially structured to complement the structure of the film unit so that, when both are brought into contact with each other, their interactions assure a proper processing fluid distribution.

These interactions may be functionally categorized into two steps. The first step involves creating a pressure within the fluid container sufficient to rupture it and release its fluid contents. The second step is that of spreading the fluid over the exposed area of the film unit as the film unit is advanced through the processing apparatus. During both of these steps, complex fluid flow phenomena occur that ultimately determine the quality of the final visible image. Because the flow phenomena is so complex, experience has shown that dependable practical results can be achieved only through running carefully controlled experiments. Results of these experiments describe the fundamental flow features in terms of the interaction of the film unit and processing apparatus variables with precision sufficient to permit alternate choices of design solutions that eliminate problem areas associated with the process.

These problem areas might for example be: (1) poor initial distribution of fluid within its container; (2) uneven release of the fluid from its container; (3) an undesirable modification of the distribution of the fluid as it is spread between the sheet elements; or (4) an excess amount of fluid after the processing operation has been completed. The first three problem areas could cause inadequate fluid coverage over the exposed area of the film unit and the last one, if not properly solved, could allow the excess fluid, which is caustic, to come into contact with the camera user or other components of the camera system.

The prior art describes numerous solutions to such problems, as for example, a flow retarding apparatus described in U.S. Pat. No. 2,991,703 or a film unit having a fluid container with integrated flow directors described in U.S. Pat. No. 3,342,600, or a film assemblage with tapered spacing strips described in U.S. Pat. No. 3,761,268. These disclosures of prior art represent a particular choice of design controllable parameters which influence the fluid thickness distribution and aid in its confinement to the film unit. It is felt, however, that the present invention provides an alternate selection which recognizes the teaching of the prior art but, for reasons which will be apparent, has inherent advantages over it.

Therefore, an object of this invention is to provide improved photographic apparatus for spreading a processing fluid between a pair of sheet elements.

Another object of this invention is to provide fluid processing apparatus that will simplify the structure of the film unit and will itself have a simplified structure.

Another object of this invention is to provide apparatus of the type indicated wherein fluid distribution and flow control are facilitated by specially configured pressure applying members.

Yet another object of this invention is to provide apparatus of the type indicated wherein the initial distribution of the fluid within its container is controlled by specially configured pressure applying members.

Other objects of the invention will in part be obvious and will in part appear hereinafter.

SUMMARY OF THE INVENTION

In its preferred embodiment the invention is depicted as an apparatus for spreading a processing fluid in a layer between a pair of photographic sheet elements at least one of which forms part of a film unit of the self-developing type.

The apparatus consists of a pair of juxtaposed rollers rotatably mounted between a pair of spaced apart vertical sections of a "U"-shaped support bracket. The vertical sections include, respectively, elongated slots which facilitate the relative translatory displacement of one of the rollers with respect to the other. Resiliently urging the rollers toward one another is a torsion spring mounted on the base of the support bracket and having end portions which cradle the journals of the roller permitted to displace within the elongated slots.

Spaced apart annular collars located opposite adjacent ends of one of the rollers extend to contact the surface of the other roller thereby separating the rollers by a minimum spacing determined by the size of the extended collars. This spacing facilitates the introduction of the film unit between the rollers prior to its being processed. One of the rollers is rigid having a substantially cylindrical configuration. The other roller consists of a structure which includes a rigid support member having a curved exterior configuration, convex in shape, over which lies a layer of resilient material of a suitable elastomer such as urethane. The resilient layer has an interior shape similar in shape to the exterior shape of the support member and an exterior sheet-contacting surface whose shape is substantially cylindrical. Because of its structure, the layer of material overlying the support member provides the structured roller with a sheet-contacting surface having variable deformation characteristics across its length since the thickness of the resilient layer varies as a function of the exterior shape of the support member. By carefully selecting the deformation characteristics of this sheet-contacting surface and recognizing its sensitivity to hydraulic pressures induced in the processing fluid during spreading of the fluid between the sheet elements, it is possible to provide simplified apparatus and film unit structure which results in an economical solution to the problems of fluid flow control and film unit size.

In addition this selectively deformable surface can be used as a means for controlling the initial distribution of the processing fluid within its storage container which, incidentally, usually forms part of the film unit.

One of the rollers also includes a gear which when engaged with suitable drive means permits the roller to be rotated such that it provides a traction force which can advance the film unit through the apparatus. The traction force in this respect would obviously depend on the friction characteristics between contacting surfaces of the sheet elements and the apparatus. Therefore, the coefficient of friction of the resilient layer can aid considerably if the apparatus is utilized with a system embracing automatic film-advancing means.

BRIEF DESCRIPTION OF THE DRAWINGS

The novel features that are considered characteristic of the invention are set forth with particularity in the appended claims. The invention, however, both as to its organization and its method of operation, together with additional objects and advantages thereof, will best be understood from the following description when read in connection with the accompanying drawings wherein like numbers have been employed in the different figures to denote the same parts and wherein:

DETAILED DESCRIPTION OF THE INVENTION

Figure 1:
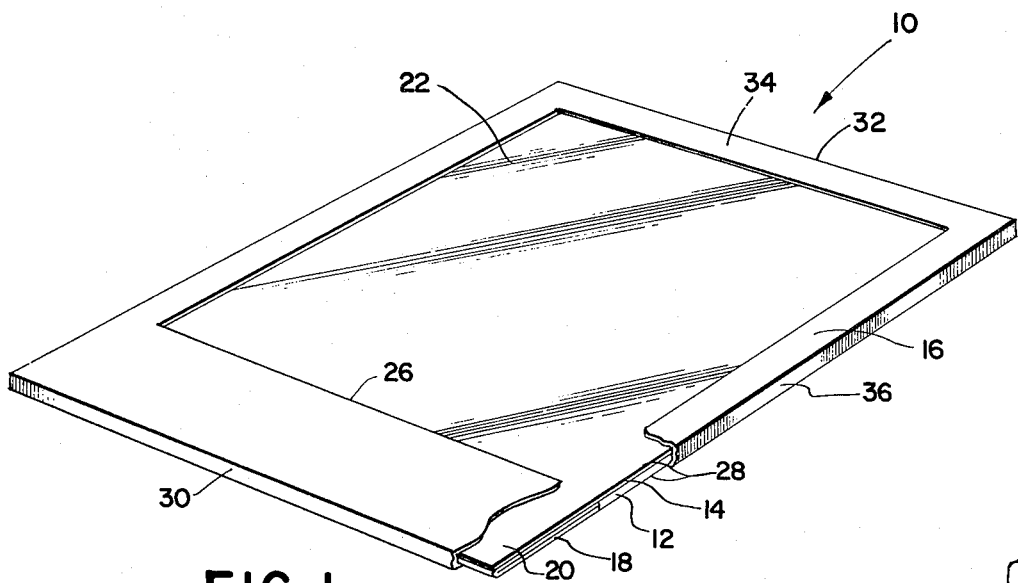
FIG. 1 is a diagrammatic perspective view, with partially broken away parts, of a self-developing film unit for use with the invention.

In the photographic sciences, a latent image is defined as being an invisible record of the position and intensity of radiation incident on a photosensitive emulsion. In order to transform a latent image to a visible picture, it is necessary to subject the exposed photosensitive emulsion to a photographic process consisting of a series of chemical and mechanical operations. Such processes may be classified using various criteria suitable for particular purposes. One classification scheme differentiates processes on the basis of the time the process requires to produce a useable picture. When compared with conventional processing means as a standard, a rapid process would be one requiring much less time to render the latent image visible. One rapid process very familiar in the art is known as diffusion transfer. The present invention relates to this process and particularly to the problems and nature of apparatus associated with the mechanical processing aspects. Specifically, the mechanical aspect of interest is that of spreading a processing fluid in a layer between a pair of superposed photographic sheet elements at least one of which forms part of a self-developing film unit that has been exposed to actinic radiation.

The processing fluid in this case chemically facilitates the formation of the visible image on an image-receiving sheet by first developing the latent image and then, as a function of development, forms and transfers image forming components from the developed emulsion to the image-receiving sheet. The quality of the final image critically depends on the uniformity of the processing fluid thickness between the sheet elements over an area corresponding to the exposure. The relationship between the film unit and the apparatus for spreading the fluid between the sheets determines the fluid thickness uniformity. In order to assure that the requirements for a high quality photograph are fully met, it is obvious that these relationships be thoroughly understood, or alternatively, the outcome be rendered deterministic by appropriate systematic means.

The complexity alluded to above is rooted in the fact that the physical relationships between the film unit and the apparatus for mechanically spreading the processing fluid are difficult, if not impossible to analyze using purely mathematical methods. Experimental methods, by far, have proven to be the most successful way of dealing with the problems of designing processing apparatus. Because the physical relationships involved can be characterized as being essentially complex fluid flow phenomena, the experimental method usually chosen is dimensional analysis. This method has proven quite successful in the organization, correlation, and interpretation of experimental data.

Briefly, dimensional analysis is a pseudo mathematical method employed in checking equations, changing units, determining a convenient arrangement of variables of a physical relation, and planning systematic experiments. Dimensional analysis, then, results in a sound, orderly arrangement of the variable physical quantities involved in a problem. Reference to experimental data must be made in order to obtain the necessary numerical values of the variables that define a solution. It should be appreciated that a study of dimensions by itself does not yield any information about the physical phenomena or the functional relation between the variables involved. It does, however, frequently aid in making an easier and more convenient description of the phenomena.

The first step in treating a problem using this method is to list all the variables involved. The selection typically comes from experience or judgment. The next step, the analysis, is made following an orderly experimental plan. The final resolution of the problem based on the selected variable arrangement is no more accurate or complete than the original choice of variables. Consequently, any incomplete or inappropriate choice of original variables will not result in a resolution of the problem but, as pointed out, generally results in sufficient insight into the physical functional relationships involved which does permit resolution through proper iterative corrections. The present invention was conceived using this technique. It, in fact, is based on the recognition of certain features of the fundamental flow patterns derived from prior experiments using apparatus not incorporating its novel features. In order to fully appreciate what these features are and how they solve the problems involved, it will be necessary to be acquainted with the general design criteria for such fluid spreading apparatus, prior experimental apparatus structure illustrating its fluid flow patterns, and the events that occur during the mechanical stages of the photographic processing of the exposed emulsion.

In order of sequence, the last will be discussed first by illustrating the structure of a typical film unit and then describing how it is treated after it is exposed.

Reference is now made to FIG. 1 wherein is illustrated a self-developing film unit 10 of the type disclosed in considerable detail in U.S. Pat. No. 3,415,644 by Edwin H. Land issued Dec. 10, 1968. It is referred to here to illustrate the relevent mechanical features of such film units and is not intended, in any sense, to restrict the applicability of the present invention. The film unit 10 has a generally rectangular photosensitive image-recording sheet element 12 wherein a latent image can be recorded. Located in superposed face to face relation with sheet element 12 is a second, slightly longer, image-receiving sheet element 14. Sheet element 14 is transparent and adapted to transmit actinic radiation to sheet element 12 during exposure. Its increased length defines an extended portion 20 under which is located a pressure-rupturable fluid container 18 adapted to release its fluid contents 19 (not shown in this figure) between the sheet elements.

A generally framelike element 16 serves multiple functions. To begin with element 16 is a generally rectangular opaque thin sheet having dimensions slightly greater than those of sheet element 14 and having portions defining a generally rectangular aperture 22 whose dimensions are slightly smaller than those of sheet element 12. Element 16 is superimposed on the surface of sheet element 14 so that aperture 22 overlies sheet element 12 to define the limits of the area of that element which can be subjected to actinic radiation. After it is superimposed on sheet element 14, those portions of element 16 that extend beyond the laterial margins of sheet element 14 are wrapped around the lateral edges of the sheets and fluid container 18 and secured to the surfaces of sheet element 12 and fluid container 18 by suitable adhesive means to form a single integrated structural unit possessing certain important physical features.

The first important feature is related to the integral nature of film unit 10 thus constructed. When the fluid contents 19 are released to be spread between the sheet elements 12 and 14, it exists as an elongated mass adjacent a leading edge 26 of the exoosure area and extending laterally to longitudinal edges 28 of the sheet elements 12 and 14. Those portions of element 16 overlapping longitudinal edges 28 function to confine fluid 19 within film unit 10 while the fluid is progressively spread over the exposed area as film unit 10 is advanced longitudinally from its leading edge 30 to its trailing edge 32 through suitable processing apparatus. In like manner, any excess fluid remaining after the advancement is complete will be confined to the film unit 10 in a region 34 located adjacent trailing edge 32 and which underlies the inward extension of element 16 on the surface of sheet element 14.

The other important features have to do with the mechanical structure that exists where element 16 overlaps longitudinal edges 28. The structure here defines spaced apart longitudinal edge portions 36 extending lengthwise from leading edge 30 to trailing edge 32 which provide a bearing surface upon which suitable pressure applying members may ride retaining longitudinal edges 28 of sheet elements 12 and 14 in face to face contact while at the same time providing a means for separating such pressure members by a distance prescribed by the thicknesses of the sheet elements plus twice the thickness of element 16. It can be appreciated that the spacing between such pressure members will allow sheet elements 12 and 14 to separate when fluid 19 is introduced between them. This separation will occur throughout the exposed area intermediate longitudinal edge portion 36.

Another important feature relevant to the operation of the invention relates to the mechanical properties of sheet elements 12 and 14. Aside from their photographic properties, they are composed of material which allows them to deform under pressure. This means that if sufficient hydraulic pressure exists in the fluid as it is spread between the sheets, they will tend to take on a shape which conforms to whatever structure resists their separating. The implication of this property will become clear in a later discussion.

Subsequent to the exposure of film unit 10, it is photographically processed by advancing it through a suitable mechanical apparatus which first serves to rupture fluid contrainer 18 releasing its fluid content 19 and then to progressively spread the fluid between sheet elements 12 and 14 as further advancement occurs. In this respect advancement of film unit 10 may be done manually or by suitable automatic means such as a motorized traction drive roller. Thus it is seen that the fluid processing apparatus performs two distinct functions.

Figure 2:
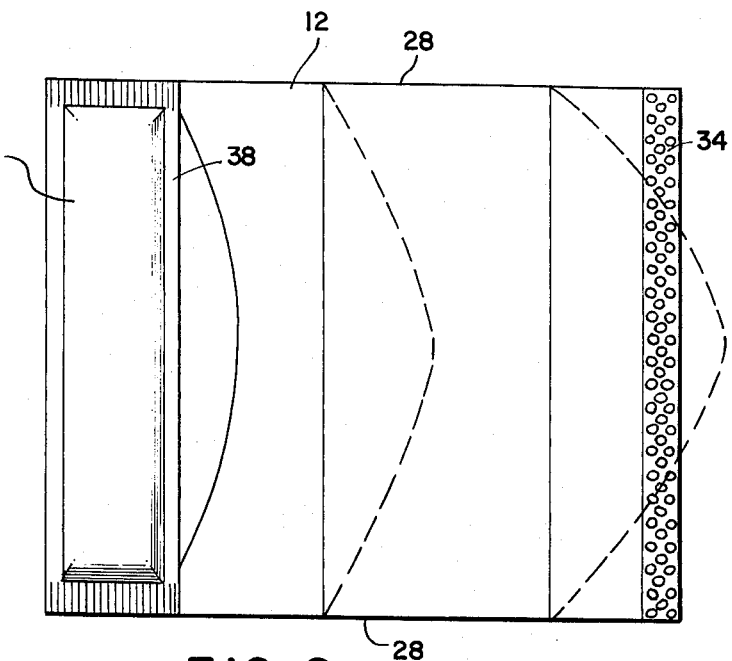
FIG. 2 is a top view of the film unit of FIG. 1, with parts broken away, illustrating problem fluid flow patterns.

The structure of such processing apparatus can take on any suitable configuration but generally comprises several fundamental structural elements. Namely, these elements are generally a pair of elongated juxtaposed pressure applying members, usually rigid rollers, biased towards one another by resilient means. The rollers are usually initially seaprated by pregap means to facilitate introduction of the film unit between them and, in addition, because of the biasing means, are adapted to define a pressure generating gap through which the flim unit is adapted to be advanced. As an exposed film unit, such as film unit 10, is advanced between such rollers the force urging the rollers together induces sufficient pressure in the fluid container 18 to rupture it and release its fluid contents 19 in an elongated mass adjacent leading edge 26 of the exposure area. The mass of fluid is then moved lengthwise across the exposure area as the film unit is advanced through the pressure generating gap formed by such rollers. Several interesting flow patterns emerge from experiments conducted using an apparatus like the one just described, i.e., one having only the fundamental structural elements. These flow patterns, which are illustrated in FIG. 2, considered with other design requirements for self-developing film units, will demonstrate the necessity for alternate design solutions such as the one offered in the present invention.

To begin with the important variables in a dimensional analysis of the fundamental apparatus includes both those associated with the film unit and apparatus.

Briefly these would be: the force urging the rollers toward one another, the rigidity of the rollers, the gap separating the rollers caused by longitudinal edge portions 36 of the film unit, the viscosity of the fluid, the rate of advancement of the film unit through the apparatus, and the flexibility of the film unit sheet elements. The performance requirement, it will be recalled, is a uniformly thick fluid layer between the sheet elements over the exposure area. In addition, the film unit size is to be kept at an absolute minimum and the fluid confined inside it because of the caustic nature of the fluid.

Experimental data has shown that manipulation of the sizes of the variables pointed out permits a certain degree of control of the flow pattern of the fluid. However, without the addition of supplementary flow control devices in the film unit or the fundamental apparatus, the flow pattern remains substantially the same. Looking at FIG. 2 the flow pattern is seen at three different locations along the exposure area. It is first shown adjacent a broken front seal 38 of fluid container 18 as a mass distributed in a curved pattern with a high concentration of fluid in the medial section of the exposure area and tapering off laterally to lower mass concentration towards the longitudinal edges 28. At about half the length of the exposure area the pattern becomes less favorably distributed. Toward the end of the exposure area the pattern is grossly changed from its original shape.

In terms of the design criteria, flow patterns like this are intolerable because they tend to require excess fluid in the container to assure complete coverage of the exposure area and therefore also necessitate a "trap" area in the film unit to retain the excess fluid. This increases the probability of leaking fluid from the film unit and requires a larger film unit. This means increased cost and size of the film unit.

Figure 3:
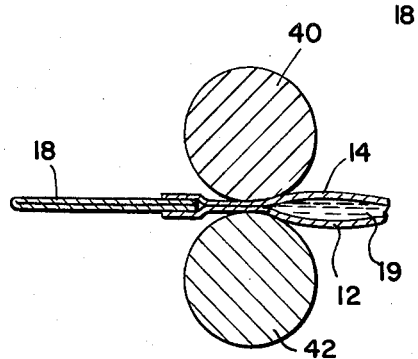
FIG. 3 is a schematic cross-sectional view of film unit and a pair of juxtaposed rigid rollers illustrating the relationship between the film unit and rollers which causes the fluid flow patterns shown in FIG. 2.

There are a variety of explanations for the existence of this characteristic flow pattern and a variety of solutions in the prior art to cope with it. Some explanations, for example, are poor initial distribution of the fluid within its container and uneven rupture of front seal 38 causing initially curved patterns. By looking at FIG. 3, one can imagine other explanations, e.g., bending of rollers 40 and 42 caused by high pressure generated in the fluid mass 19 or increased separation of the rollers because the pressure generated during processing exceeds the forces urging them toward one another, thus causing not only poor coverage but also nonuniform thickness of the fluid layer.

The solutions proposed in the prior art compensate for the characteristic flow pattern in two general ways. The first method takes notice of the possibility of the poor initial distribution of fluid within container 18 and the problem associated with uneven breakage of front seal 38. The approach essentially taken here is to provide partitions in container 18 which act as chambers for containing certain predetermined amounts of fluid in particular locations in the container thereby permitting the mass of fluid from each chamber to be distributed more evenly when each chamber seal is ruptured. In addition these chambers are geometrically designed to act as flow directors further controlling initial distribution of fluid immediately after it exits the container 18. This obviously complicates the design and manufacture of container 18 with the attendant increased cost in so doing.

Another approach is to provide a dual set of rollers spaced apart lengthwise with the forward set having low biasing forces insufficient to rupture container 18 and the rearward set performing the actual container seal-breaking function. This permits the forward set to act as a fluid retarder which delays the forward motion of the fluid in the medial section of the exposure area. It is clear that this approach, while successful, also increases size and cost because of the necessity of additional parts to the apparatus.

Yet another approach is to modify film unit 10 by providing variable thickness longitudinal edge portions 36 that control the fluid thickness layer. This has the drawback of complicating the manufacture and control of the film unit because of the requirement of accurate placing of the spacing means.

The present invention arose from a recognition of one of the functional relationships characteristic of the flow phenomena. Specifically, the pressures induced in the fluid during the spreading stage are indeed substantial and vary as a function of advancement speed. In fact the characteristic flow pattern very much appears to be not unlike the traditional parabolic velocity distribution for the laminar flow of a viscous fluid in a closed pipe. This being the case the pressure may be used in cooperation with a selectively pressure deformable surface on at least one of the pressure applying members whose characteristics would compensate for the uneven pressure distribution exemplified by the characteristic flow pattern.

As an additional benefit such a selectively deformable surface may additionally control the initial distribution of the fluid within its container just prior to the release of the fluid. This one change based on recognizing a fundamental property of the dynamic interaction of the film unit and spreading apparatus thus permits a simplification of both the film unit and apparatus while at the same time satisfies all the design requirements while permitting a reduction in cost.

Figure 5:
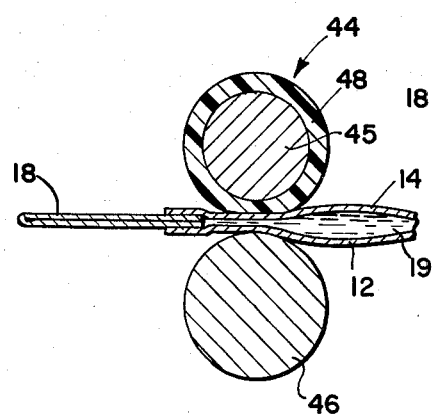
FIG. 5 is a view similar to that of FIG. 3 illustrating the relation of the rollers of the invention with a film unit which causes the improved fluid flow patterns shown in FIG. 4.
Figure 4:
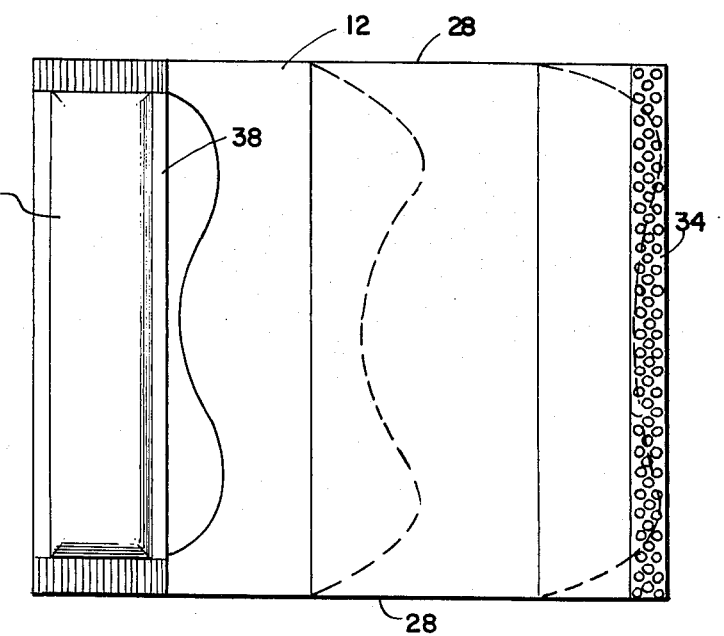
FIG. 4 is a view similar to that of FIG. 2 illustrating fluid flow patterns possible with the invention.

FIG. 5 shows schematically two rollers 44 and 46. It will be noticed that roller 44 comprises a rigid support member 45 covered with a resilient layer 48 of material which deforms under pressure. The altered flow patterns possible with this system are illustrated in FIG. 4 which should be compared with the flow patterns in FIG. 2. It is evident that the initial distributions as well as later modifications are much more compatible with the basic design requirements of complete uniform coverage with minimal film unit size.

The concept of this invention assumes that resilient biasing means urging the pressure applying members toward one another provide forces sufficient to keep the members and the longitudinal edges 28 of the sheet elements 12 and 14 in contact while permitting the surface of one of the pressure applying members to deform in a predetermined manner to control the fluid flow by initially distributing the fluid mass properly and retaining the initial distribution pattern throughout spreading.

PREFERRED EMBODIMENT

Figure 6:
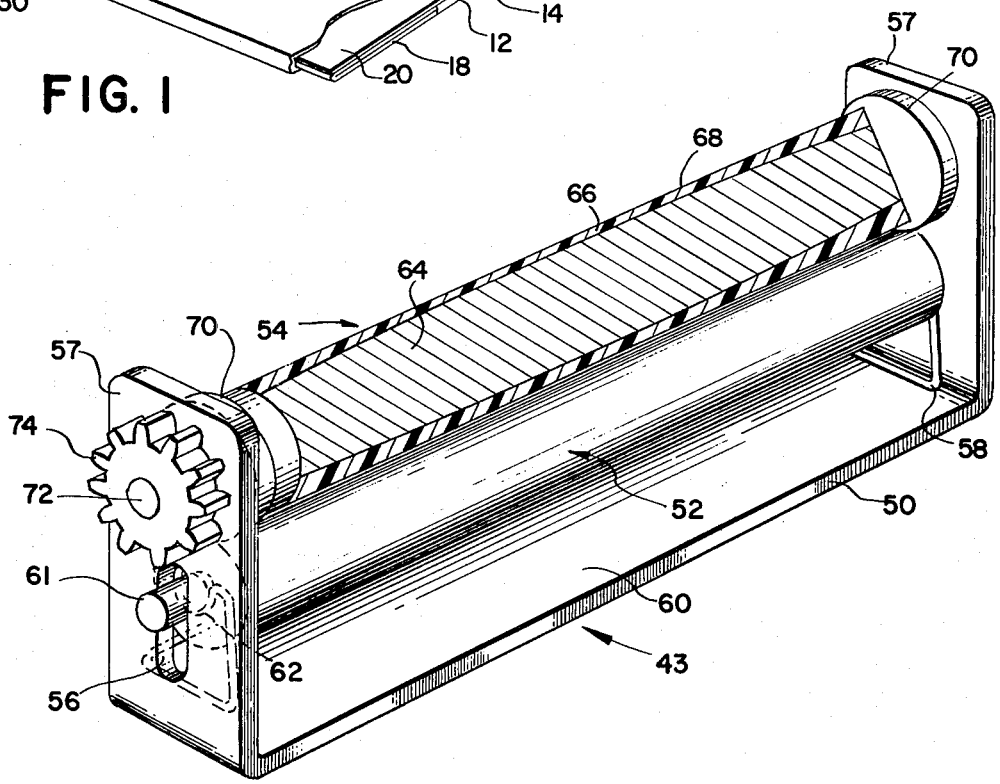
FIG. 6 is a diagrammatic prespective view of the fluid processing apparatus of the invention.

FIG. 6 illustrates a preferred embodiment of a fluid processing apparatus 43 incorporating the features of the invention. It consists of a rigid U-shaped support bracket 50 in which are rotatably mounted a pair of juxtaposed pressure applying members 52 and 54. Both members are shown as rollers with member 52 being adapted to be displaced with respect to member 54 as film unit 10 is advanced between them. In this respect bracket 50 has portions defining a pair of elongated slots 56 located in vertical tab sections 57 of bracket 50 which facilitate the relative motion of member 52 with respect to member 54 by functioning as linear guides to direct transatory displacement.

Member 52 is resiliently urged toward member 54 by a torsion like spring 58 which is mounted to base section 60 of bracket 50 with end portions 62 that cradle journals 61 of member 52.

Member 54 is a roller structure consisting of a rigid support member 64 which has a substantially convex shape. Located in overlying relation to support member 64 is a resilient layer 66 of a suitable elastomeric material such as urethane. Layer 66 has an internal shape similar to the external configuration of support member 64 and an external sheet contacting surface 68 which is substantially cylindrical. The thickness of layer 66 is therefore continuously variable thus permitting variable deformation capability across the length of member 54.

Member 54 also includes a pair of spaced apart annular collars 70 located adjacent opposite its ends. These collars extend from member 54 to contact the surface of member 52 and thereby provide a predetermined spacing between these members which facilitates the introduction of film unit 10 therebetween and a means for imparting rotary motion of member 54 to member 52.

Additionally member 54 has at least one extended journal 72 upon which is mounted a gear 74 adapted to engage a motorized system (not shown) to impart rotating motion to member 54. Inasmuch as the material of layer 66 may have high friction characteristics, it in cooperation with the rotary motion of member 54 provide a traction force for advancing film unit 10 through the apparatus 43. However the invention may be practiced without this feature thus permitting its use with film units like, for example, the one described in U.S. Pat. No. 3,765,887 which would allow the film unit to be manually advanced.

Figure 7:
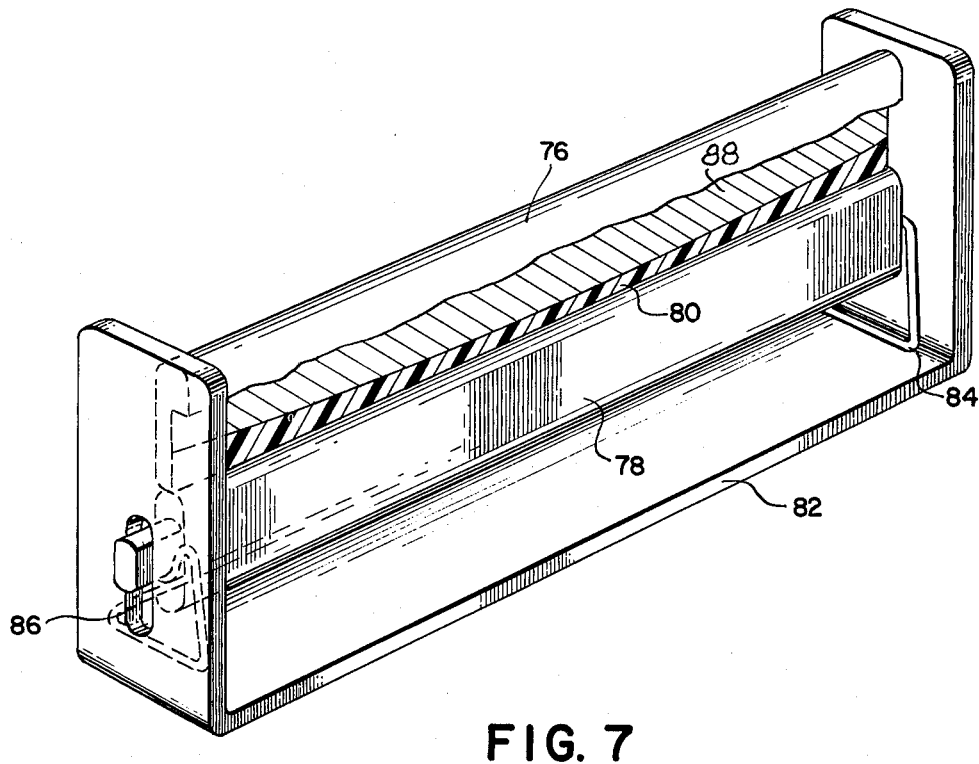
FIG. 7 is a diagrammatic perspective view of an alternative embodiment of the invention.

Another embodiment of the invention is illustrated in FIG. 7. The apparatus shown here is functionally equivalent to the previously described embodiment except that the pressure applying members 76 and 78 are elongated bar structures which are not rotatably mounted. It is evident with this embodiment that the resilient layer 80 of member 76 would have to be a low friction surface for proper functioning in terms of ease of film advancement. In other respects this embodiment is similar to that shown in FIG. 6, namely consisting of a support bracket 82, biasing spring 84, elongated guide slot 86, and rigid support member 88 of member 76.

Those familiar with the photographic arts will readily appreciate the subtlety of this inventive concept and why it achieves the simplification of both apparatus and film unit structure while minimizing costs.

This invention may be practiced or embodied in still other ways without departing from the spirit or essential character thereof. The embodiments described herein are therefore illustrative and not restrictive, the scope of the invention being indicated by the appended claims and all variations which come within the meaning of the claims are intended to be embraced therein.

What is claimed is:

1. Photographic apparatus including means for spreading a processing fluid in a layer between a pair of sheet elements, said spreading means comprising:
   a first member having a first sheet-contacting surface; and
   a second member mounted in juxtaposed relation to said first member and adapted to define a pressure generating gap therewith through which the sheet elements are adapted to be advanced during spreading of the processing fluid, said second member including a generally rigid support member having superimposed thereon a layer of resilient material having a longitudinally extending continuously varying thickness that cooperates with said support member to provide a second sheet-contacting surface having longitudinally extending variable deformation capability.

2. The apparatus of claim 1 wherein said support member has a predetermined longitudinal surface configuration and said layer of resilient material is located in overlying relation to said support member surface, said layer including an external longitudinally extending surface forming said second sheet-contacting surface and an internal longitudinally extending surface similar to that of said support member so that the thickness of said layer varies longitudinally thereby providing said second sheet-contacting surface with longitudinally varying deformation capability.

3. The apparatus of claim 2 wherein said predetermined longitudinal surface configuration of said support member is convex.

4. The apparatus of claim 3 wherein said support member of said second member is comprised of stainless steel and said layer of said resilient material is comprised of an elastomer.

5. The apparatus of claim 4 wherein said elastomer is urethane.

6. Photographic apparatus as defined in claim 3 further including means for resiliently urging one of said first and second members towards one another.

7. The apparatus of claim 6 wherein said first member comprises a rotatably mounted elongated roller.

8. The apparatus of claim 7 wherein said layer of resilient material is comprised of an elastomer.

9. The apparatus of claim 8 wherein said elastomer is urethane.

10. The apparatus of claim 7 wherein said support member of said second member is elongated and rotatably mounted whereby it comprises a noncylindrical roller.

11. The apparatus of claim 10 wherein said second sheet-contacting surface has a substantially cylindrical configuration.

12. The apparatus of claim 10 further including means for driving at least one of said rollers to cause said one roller to impart rotary motion to the other of said rollers prior to the introduction of the pair of sheet elements between said rollers and to cause said second sheet-contacting surface to advance the pair of sheet elements between said rollers once the pair of sheet elements have been brought into operative relationship therewith.

13. The apparatus of claim 12 further including means for limiting the movement of said rollers towards one another under the influence of said urging means to define a minimum spacing between said sheet-contacting surfaces thereby facilitating the introduction therebetween of said sheet elements.

14. The apparatus of claim 13 wherein said movement limiting means includes a pair of annular collars provided with bearing surfaces mounted on one of said rollers and extending towards the other said roller, and supporting surfaces on said other roller to respectively engage said collar bearing surfaces, said bearing and supporting surfaces comprising relatively low-friction non-resilient surfaces, said annular collars being spaced apart a distance greater than the widest sheet element and respectively located adjacent opposite ends of said second sheet-contacting surface, said collars transmitting rotary motion of said one driven roller to the other of said rollers prior to the advancement of the sheet elements between said rollers.

* * * * *